US010550971B2

(12) United States Patent
Madara et al.

(10) Patent No.: US 10,550,971 B2
(45) Date of Patent: Feb. 4, 2020

(54) PIPE ELEMENT HAVING WEDGING GROOVE

(71) Applicant: Victaulic Company, Easton, PA (US)

(72) Inventors: Scott D. Madara, Nazareth, PA (US); Amit R. Shah, Quakertown, PA (US); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 334 days.

(21) Appl. No.: 15/409,688

(22) Filed: Jan. 19, 2017

(65) Prior Publication Data

US 2017/0211731 A1    Jul. 27, 2017

Related U.S. Application Data

(60) Provisional application No. 62/287,015, filed on Jan. 26, 2016.

(51) Int. Cl.
F16L 21/06 (2006.01)
F16L 17/04 (2006.01)

(52) U.S. Cl.
CPC .............. F16L 21/06 (2013.01); F16L 17/04 (2013.01)

(58) Field of Classification Search
CPC ......... F16L 21/06; F16L 21/065; F16L 17/04; F16L 9/006
USPC .................................. 285/373, 420; 138/177
See application file for complete search history.

(56) References Cited

U.S. PATENT DOCUMENTS

| 3,015,502 A | * | 1/1962 | Frost ..................... F16L 17/04 285/373 X |
|---|---|---|---|
| 3,967,837 A | * | 7/1976 | Westerlund ............ F16L 17/04 |
| 4,111,464 A | | 9/1978 | Asano et al. |
| 4,593,944 A | | 6/1986 | Milberger |
| 4,880,068 A | | 11/1989 | Bronson |
| 5,080,400 A | | 1/1992 | Adamek et al. |
| 5,201,554 A | | 4/1993 | Gagg et al. |

(Continued)

FOREIGN PATENT DOCUMENTS

| JP | 2009103303 | 5/2009 |
|---|---|---|
| KR | 101021892 | 3/2011 |

(Continued)

OTHER PUBLICATIONS

Young, Lee W.; PCT International Search Report and Written Opinion regarding International Application No. PCT/US17/014015, dated May 8, 2017.

Primary Examiner — Zachary T Dragicevich
(74) Attorney, Agent, or Firm — Ballard Spahr LLP

(57) ABSTRACT

A pipe element has a circumferential groove with a surface portion oriented at an angle with respect to its longitudinal axis. A surface portion of the groove adjacent to the angled surface portion is oriented perpendicular to the longitudinal axis. A mechanical coupling has projecting keys that engage the groove. The keys have mating surfaces that contact both the perpendicular and angled surface portions of the groove. When the pipe element and coupling are used in combination to form a pipe joint, axial load on the pipe, resisted by the mechanical coupling, is shared between the perpendicular and angled surface portions which results in a pipe joint that can withstand higher internal pressure than if the axial load were borne by the perpendicular surface portion alone.

25 Claims, 6 Drawing Sheets

(56) References Cited

U.S. PATENT DOCUMENTS

| | | |
|---|---|---|
| 5,813,705 A | 9/1998 | Dole |
| 7,516,636 B2 | 4/2009 | Dole |
| 8,267,432 B2 | 9/2012 | Madara et al. |
| 2004/0169372 A1 | 9/2004 | LeMay et al. |
| 2005/0212284 A1 | 9/2005 | Dole |
| 2005/0212296 A1* | 9/2005 | Dole .................... F16L 21/065 285/420 |
| 2009/0127846 A1 | 5/2009 | Dole et al. |
| 2009/0200799 A1 | 8/2009 | Dole et al. |
| 2010/0148493 A1 | 6/2010 | Madara et al. |
| 2010/0289257 A1 | 11/2010 | Madara |
| 2012/0139236 A1* | 6/2012 | Novitsky ................ F16L 21/06 |
| 2013/0125373 A1 | 5/2013 | Bancroft |
| 2013/0185919 A1* | 7/2013 | Beagen, Jr. ............. F16L 17/04 |
| 2018/0163905 A1 | 6/2018 | Ohnemus et al. |
| 2018/0163906 A1 | 6/2018 | Ohnemus et al. |

FOREIGN PATENT DOCUMENTS

| | | |
|---|---|---|
| KR | 101433155 | 8/2014 |
| KR | 101488337 | 1/2015 |

\* cited by examiner

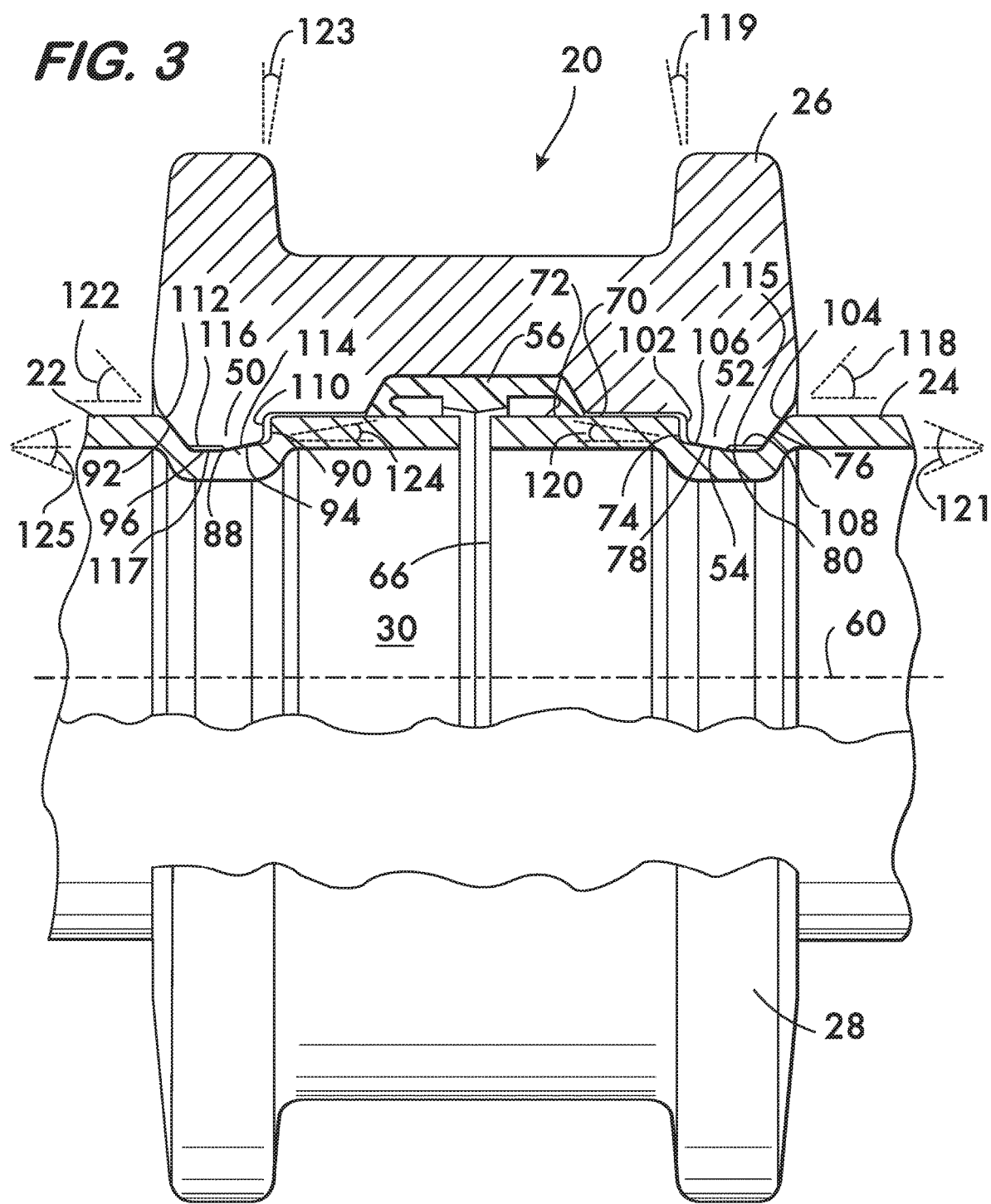

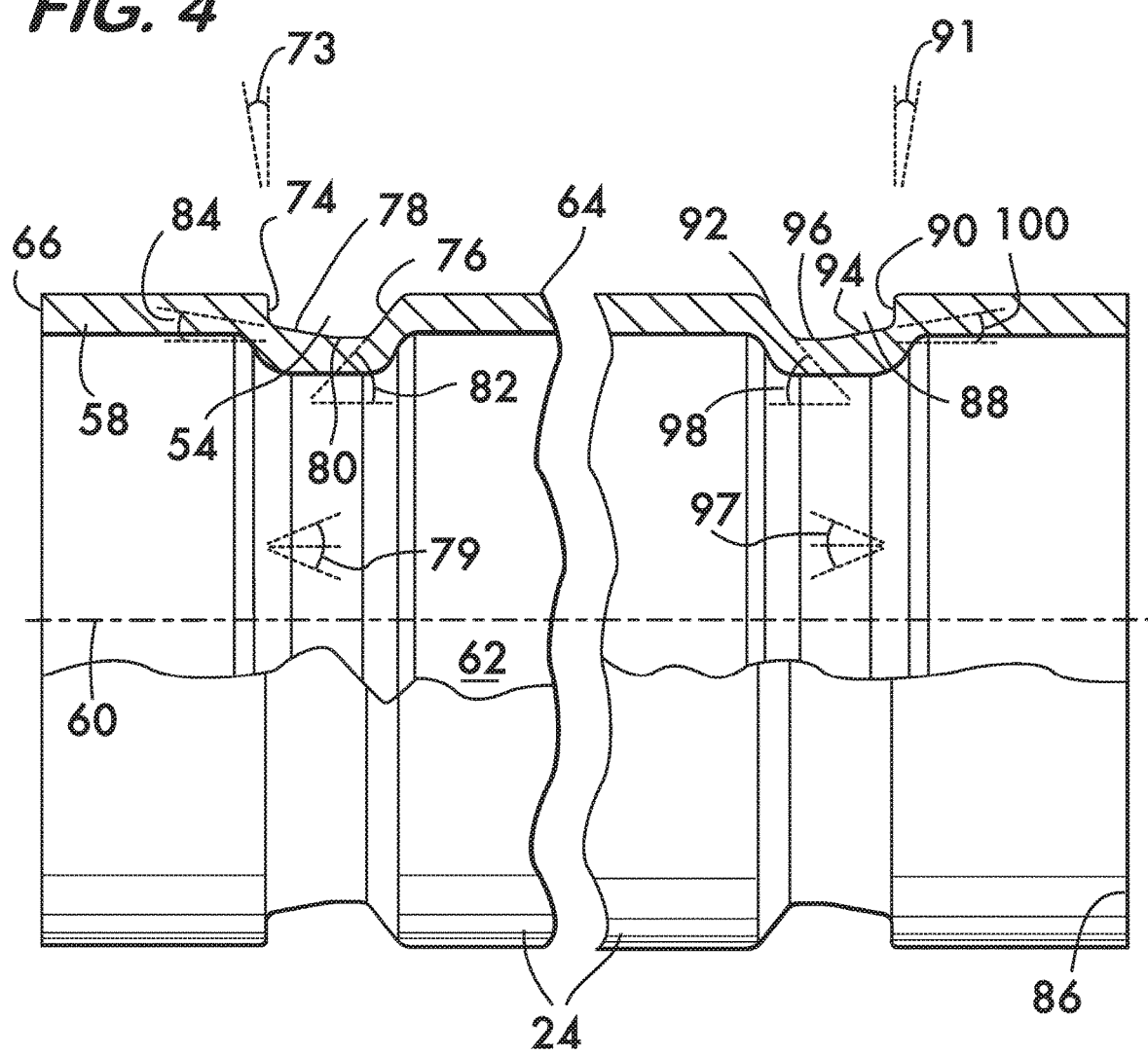

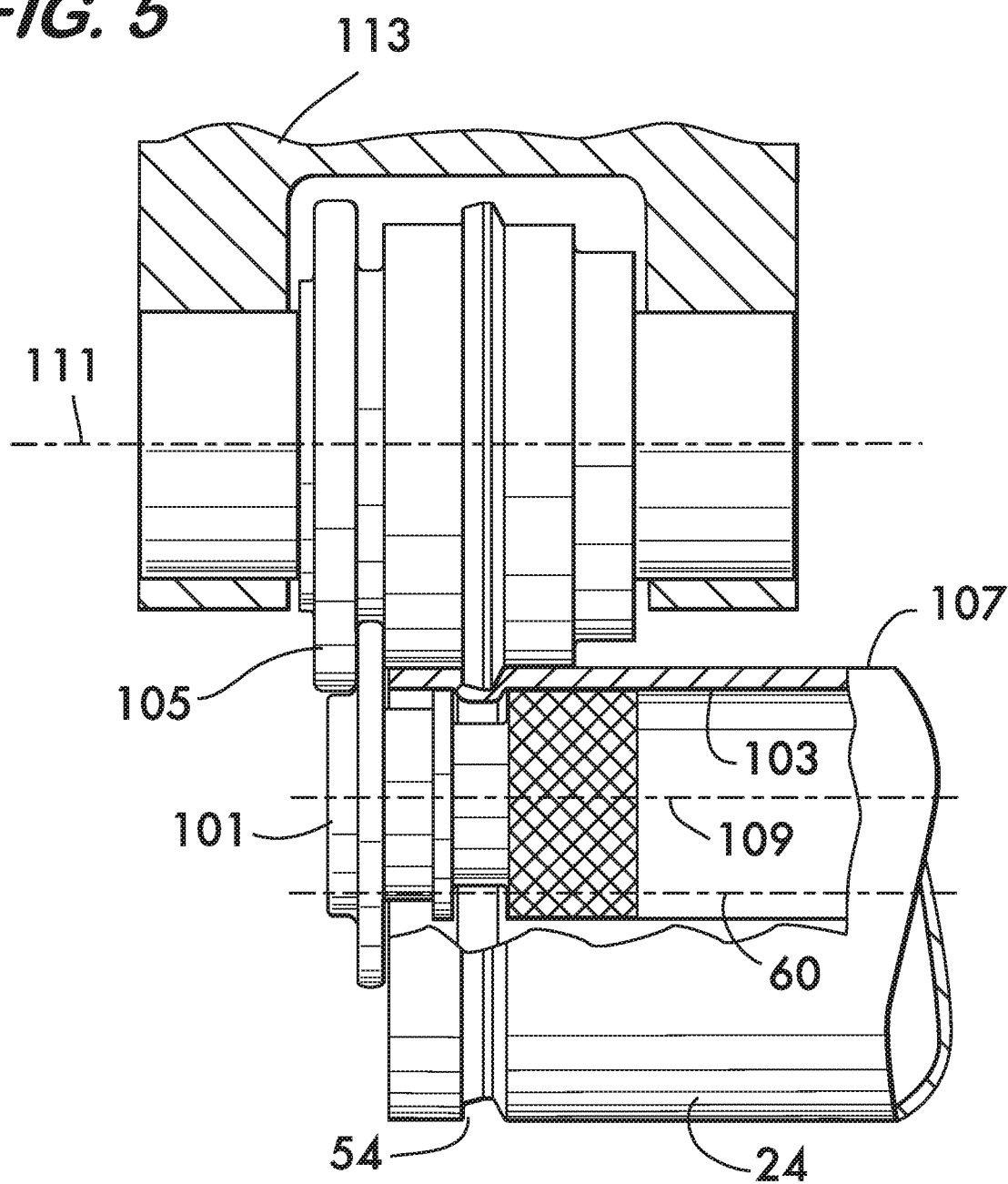

PIPE ELEMENT HAVING WEDGING GROOVE

CROSS REFERENCE TO RELATED APPLICATION

This application is based upon and claims priority to U.S. Provisional Application No. 62/287,015, filed Jan. 26, 2016 and hereby incorporated by reference.

FIELD OF THE INVENTION

This invention concerns improved groove shapes for pipe elements joined by mechanical couplings, and coupling key shapes compatible with improved groove shapes.

BACKGROUND

As shown in FIG. 1, one type of prior art mechanical coupling 10 for joining pipe elements 12 and 14 end to end relies on arcuate projections, known as keys 16 that mechanically engage circumferential grooves 18 in the pipe elements. While these couplings have proved to be very effective and efficient, the prior art configuration is subject to certain limitations. For example, when such a joint is subjected to loads, especially loads arising from internal pressure induced end loads, axial tensile forces and bending, the joint may not be able to withstand such loads up to the full tensile strength of certain types of pipe. To realize a greater percentage of the potential strength of the pipe element and thereby increase the pressure capacity of a joint, external rings containing grooves may be welded to pipe elements to provide for mechanical engagement with the coupling's keys in a configuration that does not alter the pipe element's sidewall, either by removing material (machined grooves) or by deforming the sidewall (rolled grooves).

While welded external rings may permit a larger percentage of the full pipe strength to be realized at a joint, the disadvantage of this solution is the need to weld rings onto the pipe elements. This procedure adds cost, time and requires skilled welders, complicating fabrication. There is clearly a need for a pipe design that improves the realization of pipe element strength and thereby increases the internal pressure performance and axial tensile loading limits achievable using mechanical couplings without the need for external welded rings.

SUMMARY

The invention concerns a pipe element having first and second oppositely disposed ends. In one example embodiment the pipe element comprises a sidewall surrounding a longitudinal axis and defining a bore. The sidewall has an outer surface. A first groove is positioned in the outer surface. The first groove extends circumferentially around the bore and is positioned proximate to the first end. The first groove is defined by a first plurality of sub-surfaces of the outer surface including:

a first sub-surface oriented at an angle with respect to the longitudinal axis and facing away from the first end;
a second sub-surface oriented at an angle with respect to the longitudinal axis, the second sub-surface being in spaced relation away from and facing toward the first sub-surface;
a third sub-surface contiguous with the first sub-surface, the third sub-surface oriented at an angle with respect to the longitudinal axis and sloping toward the second sub-surface; and
a fourth sub-surface contiguous with the third and second sub surfaces, the fourth sub-surface being oriented at an angle with respect to to the longitudinal axis.

In a specific example embodiment the first sub-surface has an orientation angle from 80° to 90° with respect to the longitudinal axis. Further by way of example, the first sub-surface has an orientation angle of 89° with respect to the longitudinal axis. In another example, the third sub-surface has an orientation angle from 1° to 25° with respect to the longitudinal axis. In a further example, the third sub-surface has an orientation angle of 10° with respect to the longitudinal axis. In another example the second sub-surface has an orientation angle of 90° with respect to the longitudinal axis. Further by way of example, the second sub-surface has an orientation angle from 40° to 70° with respect to the longitudinal axis. In an example embodiment the second sub-surface has an orientation angle of 50° with respect to the longitudinal axis. In a further example embodiment the fourth sub-surface has an orientation angle from +5° to −5° with respect to the longitudinal axis.

In an example embodiment the pipe element further comprises a second groove positioned in the outer surface. The second groove extends circumferentially around the bore and positioned proximate to the second end. The second groove is defined by a second plurality of sub-surfaces of the outer surface including:

a fifth sub-surface oriented at an angle with respect to the longitudinal axis and facing away from the second end;
a sixth sub-surface oriented at an angle with respect to the longitudinal axis, the sixth sub-surface being in spaced relation away from and facing toward the fifth sub-surface;
a seventh sub-surface contiguous with the fifth sub-surface, the seventh sub-surface oriented at an angle with respect to the longitudinal axis and sloping toward the sixth sub-surface; and
an eighth sub-surface contiguous with the seventh and sixth sub surfaces, the eighth sub-surface oriented at an angle with respect to the longitudinal axis.

In another example embodiment the first and fifth sub-surfaces have an orientation angle from 80° to 90° with respect to the longitudinal axis. Further by way of example, the first and fifth sub-surfaces have an orientation angle 89° with respect to the longitudinal axis. In another example, the third and seventh sub-surfaces have an orientation angle from 1° to 25° with respect to the longitudinal axis. By way of further example, the third and seventh sub-surfaces have an orientation angle of 10° with respect to the longitudinal axis. In another example, the second and sixth sub-surfaces have an orientation angle of 90° with respect to the longitudinal axis. In another example, the second and sixth sub-surfaces have an orientation angle from 40° to 70° with respect to the longitudinal axis. Further by way of example, the second and sixth sub-surfaces have an orientation angle of 50° with respect to the longitudinal axis. In another example, the fourth and eighth sub-surfaces have an orientation angle from +5° to −5° with respect to the longitudinal axis.

The invention further encompasses, in combination, a pipe element as described above and a coupling. In one example embodiment the coupling comprises a plurality of segments attached to one another end to end surrounding the first end of the pipe element. Adjustable attachment members are positioned at each end of the segments for attaching the segments to one another. At least one arcuate projection is positioned on one side of each of the segments and engages with the first groove. The at least one arcuate projection comprises a plurality of mating surfaces including:
- a first mating surface oriented at an angle with respect to the longitudinal axis and in facing relation with the first sub-surface;
- a second mating surface oriented at an angle with respect to the longitudinal axis and in facing relation with the second sub-surface;
- a third mating surface oriented at an angle with respect to the longitudinal axis and contacting the third sub-surface; and
- a fourth mating surface in facing relation with the fourth sub-surface.

In an example embodiment a gap is positioned between the fourth mating surface and the fourth sub-surface. In a further example, the at least one arcuate projection comprises a recess therein forming the gap between fourth mating surface and the fourth sub-surface.

A further example embodiment comprises, in combination, a pipe element as described above and a coupling. By way of example the coupling comprises a plurality of segments attached to one another end to end surrounding the first end of the pipe element. Adjustable attachment members are positioned at each end of the segments for attaching the segments to one another. At least one arcuate projection is positioned on one side of each of the segments and engages with the first groove. The at least one arcuate projection comprises a plurality of mating surfaces including:
- a first mating surface oriented perpendicular to the longitudinal axis and in facing relation with the first sub-surface;
- a second mating surface oriented perpendicular to the longitudinal axis and in facing relation with the second sub-surface;
- a third mating surface oriented at an angle with respect to the longitudinal axis and contacting the third sub-surface; and
- a fourth mating surface in facing relation with the fourth sub-surface.

By way of example, a gap is positioned between the fourth mating surface and the fourth sub-surface. In a further example the at least one arcuate projection comprises a recess therein forming the gap between the fourth mating surface and the fourth sub-surface. In an example embodiment the coupling comprises no more than two segments.

The invention also encompasses a coupling for joining pipe elements. In an example embodiment the coupling comprises a plurality of segments attached to one another end to end surrounding a central space for receiving the pipe elements. Adjustable attachment members are positioned at each end of the segments for attaching the segments to one another. At least a first arcuate projection is positioned on a first side of each of the segments. The first arcuate projections comprise a plurality of mating surfaces including:
- a first mating surface oriented at an angle with respect to a longitudinal axis extending through the central space coaxially with the segments;
- a second mating surface in spaced relation from the first mating surface and oriented at an angle with respect to the longitudinal axis;
- a third mating surface contiguous with the first mating surface and oriented at an angle with respect to the longitudinal axis; and
- a fourth mating surface between the third and second mating surfaces and oriented at an angle with respect to the longitudinal axis.

In an example embodiment the pipe element further comprises a second arcuate projection positioned on a second side of each of the segments. The second arcuate projections comprise a plurality of mating surfaces including:
- a fifth mating surface oriented at an angle with respect to the longitudinal axis;
- a sixth mating surface in spaced relation from the fifth mating surface and oriented at an angle with respect to the longitudinal axis;
- a seventh mating surface contiguous with the fifth mating surface and oriented at an angle with respect to the longitudinal axis; and
- an eighth mating surface between the sixth and seventh mating surfaces and oriented at an angle with respect to the longitudinal axis.

In an example embodiment the first mating surface has an orientation angle from 80° to 90° with respect to the longitudinal axis. In another example embodiment the first mating surface has an orientation angle of 89° with respect to the longitudinal axis. By way of further example the third mating surface has an orientation angle from 1° to 25° relative to the longitudinal axis. In another example the third mating surface has an orientation angle of 10° relative to the longitudinal axis. In a further example the second mating surface has an orientation angle of 90° with respect to the longitudinal axis. In another example the second mating surface has an orientation angle from 40° to 70° relative to the longitudinal axis. Further by way of example the second mating surface has an orientation angle of 50° relative to the longitudinal axis. In another example the fourth mating surface has an orientation angle from +5° to −5° with respect to the longitudinal axis. In an example embodiment the first and fifth mating surfaces have an orientation angle from 80° to 90° with respect to the longitudinal axis. Further by way of example, the first and fifth mating surfaces have an orientation angle of 89° with respect to the longitudinal axis. In another example, the third and seventh mating surfaces have an orientation angle from 1° to 25° relative to the longitudinal axis. Further by way of example, the third and seventh mating surfaces have an orientation angle of 10° relative to the longitudinal axis. Also by way of example, the second and sixth mating surfaces have an orientation angle of 90° with respect to the longitudinal axis. In an example embodiment, the second and sixth mating surfaces have an orientation angle from 40° to 70° relative to the longitudinal axis. In a further example, the second and sixth mating surfaces have an orientation angle of 50° relative to the longitudinal axis. In another example, the fourth and eighth mating surfaces have an orientation angle from +5° to −5° with respect to the longitudinal axis.

The invention also encompasses, in combination, a coupling as described above and a pipe element. In one example embodiment the pipe element comprises a sidewall surrounding the longitudinal axis and defining a bore. The sidewall has an outer surface. A first groove is positioned in the outer surface. The first groove extends circumferentially around the bore and is positioned proximate to the first end. The first groove is defined by a first plurality of sub-surfaces of the outer surface including:
- a first sub-surface oriented at an angle with respect to the longitudinal axis and in facing relation with the first mating surface;

a second sub-surface oriented at an angle with respect to the longitudinal axis and in facing relation with the second mating surface;
a third sub-surface oriented at an angle with respect to the longitudinal axis and contacting the third mating surface; and
a fourth sub-surface in facing relation with the fourth mating surface.

In an example embodiment a gap is positioned between the fourth mating surface and the fourth sub-surface. In an example embodiment the first arcuate projection comprises a recess therein forming the gap between the fourth mating surface and the fourth sub-surface.

Another example embodiment comprises, in combination, a coupling as described above and a pipe element. By way of example the pipe element comprises:
a sidewall surrounding the longitudinal axis and defining a bore, the sidewall having an outer surface;
a first groove positioned in the outer surface, the first groove extending circumferentially around the bore and positioned proximate to the first end, the first groove being defined by a first plurality of sub-surfaces of the outer surface including:
a first sub-surface oriented perpendicular to the longitudinal axis and in facing relation with the first mating surface;
a second sub-surface oriented perpendicular to the longitudinal axis and in facing relation with the second mating surface;
a third sub-surface oriented at an angle with respect to the longitudinal axis and contacting the third mating surface; and
a fourth sub-surface in facing relation with the fourth mating surface.

By way of example a gap is positioned between the fourth mating surface and the fourth sub-surface. In an example embodiment the first arcuate projection comprises a recess therein forming the gap between the fourth mating surface and the fourth sub-surface.

In an example embodiment the coupling comprises no more than two segments.

The invention also encompasses a method of assembling a coupling having an arcuate projection with a pipe element. In one example embodiment the method comprises:
contacting the third sub-surface of the groove with a portion of the arcuate projection;
contacting the second sub-surface of the groove with another portion of the arcuate projection.

The invention also encompasses a method of using a coupling having an arcuate projection engaged with a groove of a pipe element. In one example the method comprises:
applying a tensile force between the pipe element and the coupling, thereby causing a portion of the arcuate projection to engage the first sub-surface and another portion of the arcuate projection to engage the third sub-surface.

BRIEF DESCRIPTION OF DRAWINGS

FIG. 3 is a longitudinal sectional view of a portion of an example coupling and pipe elements according to the invention shown initially upon assembly;
FIG. 4 is a partial longitudinal sectional view of an example pipe element according to the invention;
and
FIG. 5 is a partial longitudinal sectional view illustrating a device and a method for forming pipe elements according to the invention.

DETAILED DESCRIPTION

Figure 1:
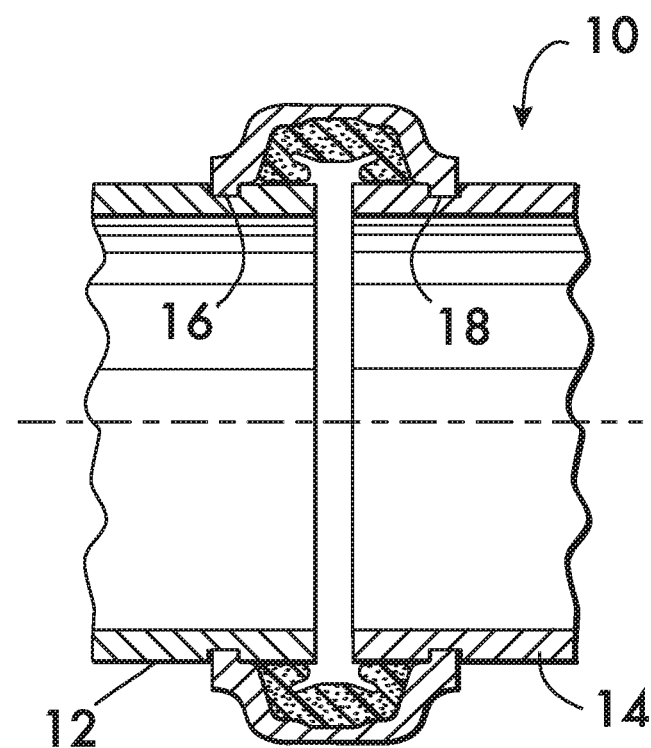
FIG. 1 is a longitudinal sectional view of a pipe joint according to the prior art.
Figure 2:
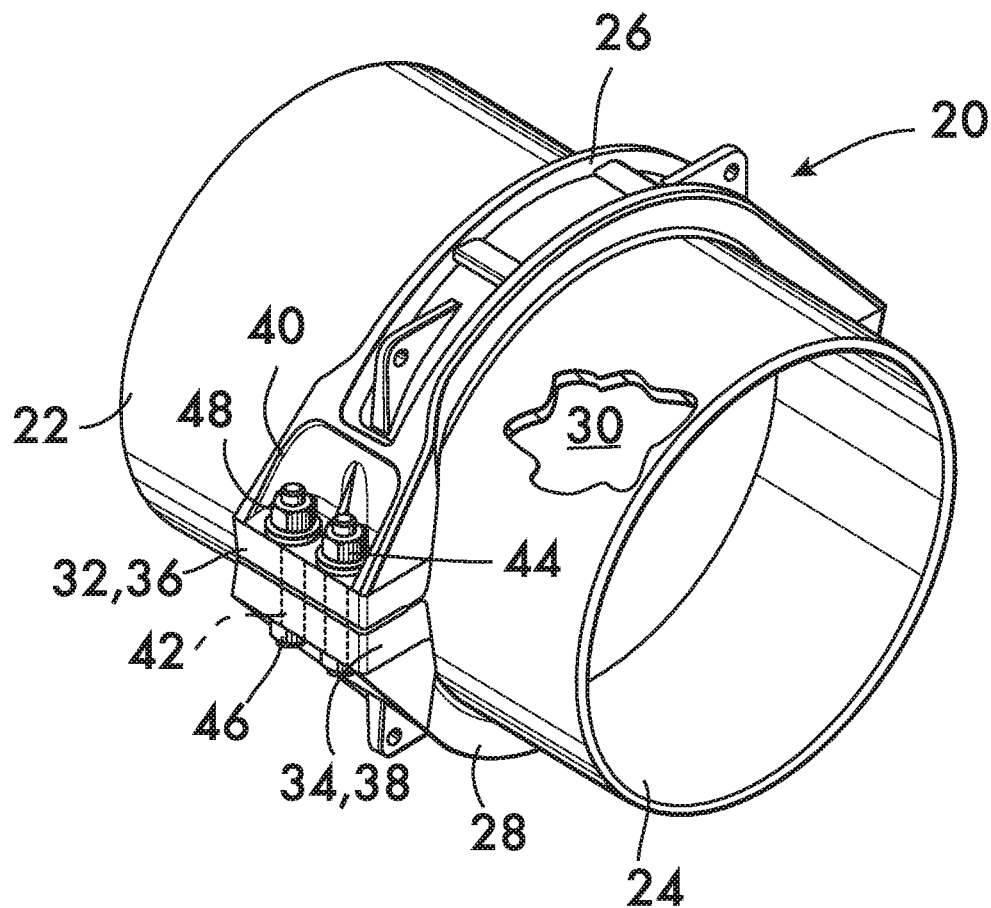
FIG. 2 is an isometric view of an example combination coupling and pipe elements according to the invention.

FIG. 2 shows an example mechanical pipe coupling 20 according to the invention joining example pipe elements 22 and 24 according to the invention. Coupling 20 comprises segments 26 and 28 attached end to end to surround a central space 30 which receives the pipe elements 22 and 24. Attachment of the segments to one another is effected by adjustable attachment members 32 and 34 which, in this example, comprise lugs 36 and 38 that respectively project from opposite ends of each segment 26 and 28. Lugs 36 and 38 in this example have reinforcing gussets 40 and openings 42 that receive fasteners 44, in this example studs 46 and nuts 48.

As shown in the sectional view of FIG. 3, each segment (26 being shown in section) has two arcuate projections, also known as keys 50 and 52 positioned on opposite sides of each segment. Keys 52 and 50 project toward the central space 30 and mechanically engage respective circumferential grooves 54 and 88 in each pipe element. A fluid tight joint is ensured by a ring seal 56 captured and compressed between the segments 26 and 28 and the pipe elements 22 and 24 when fasteners 44 (see FIG. 2) are adjustably tightened to draw the segments 26 and 28 toward one another and into engagement with the pipe elements to form the joint.

FIG. 4 shows pipe element 24 and its groove 54 in detail. In this example pipe element 24 comprises a sidewall 58 surrounding a longitudinal axis 60 and defining a bore 62. Groove 54 is positioned in an outer surface 64 of the sidewall 58. Groove 54 extends circumferentially about the bore 62 and is positioned proximate to an end 66 of the pipe element 24. As shown in FIG. 3, the position of the groove 54 with respect to the pipe end 66 is coordinated with the coupling 20 so as to provide lands 70 for sealing engagement with the glands 72 of the ring seal 56.

As shown in FIG. 4, groove 54 comprises a first sub-surface 74 shown oriented perpendicular (90°) relative to the longitudinal axis 60. The orientation angle 73 of first sub-surface 74 may range from 80° to 90° with respect to the longitudinal axis 60, with an orientation angle of about 89° being advantageous. First sub-surface 74 faces away from the end 66 of the pipe element 24. A second sub-surface 76 is oriented at an angle with respect to the longitudinal axis 60. Second sub-surface 76 is positioned in spaced relation away from the first sub-surface 74 and faces the end 66 of the pipe element 24. A third sub-surface 78 is contiguous with the first sub-surface 74, is oriented at an angle with respect to the longitudinal axis 60 and slopes toward the second sub-surface 76. A fourth sub-surface 80 is contiguous with both the second and third sub-surfaces. The fourth sub-surface 80 is shown oriented parallel (0° angle) to the longitudinal axis 60, but its orientation angle 79 may range from +5° to −5° for a practical design. The terms "perpendicular", "parallel" and "oriented at an angle" mean perpendicular or parallel or oriented at an angle with respect to a reference axis within normal manufacturing tolerances for the pipe element in question.

In a practical design, second sub-surface 76 may have an orientation angle 82 from about 40° to about 70° relative to the longitudinal axis 60; an orientation angle 82 of about 50° is considered advantageous for certain applications. Similarly, the third sub-surface 78 may have an orientation angle 84 from about 1° to about 25° relative to the longitudinal axis 60, and an orientation angle 84 of about 10° is considered advantageous for certain applications.

As further shown in FIG. 4, pipe element 24 may have a second end 86 oppositely disposed from the end 66 (which may thus be considered the "first" end), the second end 86 having a second groove 88 with a groove configuration similar to the first groove 54. In this example embodiment second groove 88 comprises a fifth sub-surface 90 shown oriented perpendicular (90°) to the longitudinal axis 60. The orientation angle 91 of fifth sub-surface 90 may range from 80° to 90° with respect to the longitudinal axis 60, with an orientation angle of about 89° being advantageous. Fifth sub-surface 90 faces away from the second end 86 of the pipe element 24. A sixth sub-surface 92 is oriented at an angle with respect to the longitudinal axis 60. Sixth sub-surface 92 is positioned in spaced relation away from the fifth sub-surface 90 and faces the second end 86 of the pipe element 24. A seventh sub-surface 94 is contiguous with the fifth sub-surface 90, is oriented at an angle with respect to the longitudinal axis 60 and slopes toward the sixth sub-surface 92. An eighth sub-surface 96 is contiguous with both the sixth and seventh sub-surfaces. The eighth sub-surface 96 is shown oriented parallel (0° angle) to the longitudinal axis 60, but its orientation angle 97 may range from about +5° to about −5° for a practical design.

In a practical design, sixth sub-surface 92 may have an orientation angle 98 from about 40° to about 70° relative to the longitudinal axis 60; an orientation angle 98 of about 50° is considered advantageous for certain applications. Similarly, the seventh sub-surface 94 may have an orientation angle 100 from about 1° to about 25° relative to the longitudinal axis 60, and an orientation angle 100 of about 10° is considered advantageous for certain applications.

Grooves 54, 88 may be formed in pipe elements 22 and 24 by roll grooving, as shown in FIG. 5. As shown by way of example for groove 54 in pipe element 24, the pipe element is cold worked while being rotated between an inner roller 101 that contacts the inside surface 103 of the pipe element, and an outer roller 105 that contacts the pipe element outer surface 107. Typically, the inner roller 101 is driven (rotated about an axis 109 parallel to the longitudinal axis 60 of the pipe element 24). The driven inner roller 101 rotates the pipe element, which, in turn rotates the outer roller 105 about an axis 111 as a result of contact friction between the rollers and the pipe element. The outer roller 105, being an idler, is usually forced toward the inner roller 101 with a hydraulic ram 113, deforming the pipe element and forming the groove 54 having a shape dictated by the shapes of the inner and outer rollers 101 and 105. Grooves 54 and 88 may also be formed by machining operations.

FIGS. 2 and 3 show a combination pipe element (22 and/or 24) and coupling 20 connecting the pipe elements end to end. FIG. 3 shows in detail, the cross sectional geometry of the arcuate projections or keys 50 and 52 effecting mechanical engagement with circumferential grooves 88 and 54 in each pipe element 22 and 24 initially upon assembly of the joint, i.e. prior to the application of internal pressure induced end loads, axial tensile forces and bending loads.

In this example embodiment, key 52 comprises a plurality of mating surfaces including a first mating surface 102 shown oriented perpendicular to the longitudinal axis 60 and in facing relation with the first sub-surface 74. Note initially upon assembly there usually will be a gap between first mating surface 102 and first sub-surface 74 because the angular relationship between sub-surface 78 and sub-surface 80 tends to bias the location of key 52 away from sub-surface 74. A second mating surface 104 is oriented at an angle with respect to the longitudinal axis 60, is spaced away from the first mating surface 102, and contacts the second sub-surface 76 initially upon assembly. A third mating surface 106 is oriented at an angle with respect to the longitudinal axis 60 and is contiguous with the first mating surface 102. Third mating surface 106 contacts third sub-surface 78 initially upon assembly. A fourth mating surface 108 is between the second and third mating surfaces 104 and 106, is in facing relation with the fourth sub-surface 80 and in spaced apart relation therefrom thereby forming a gap 115. The gap 115 is ensured by the fourth mating surface 108 comprising a recess in the arcuate projection (key) 52. Similarly, key 50 also comprises a plurality of mating surfaces including a fifth mating surface 110 shown oriented perpendicular to the longitudinal axis 60 and in facing relation with the fifth sub-surface 90. A gap is typically present between the fifth mating surface 110 and the fifth sub-surface 90 initially upon assembly because the angular relationship between sub-surface 94 and sub-surface 96 tends to bias the location of key 50 away from sub-surface 90. A sixth mating surface 112 is oriented at an angle with respect to the longitudinal axis 60, is spaced away from the fifth mating surface 110, and contacts the sixth sub-surface 92 initially upon assembly. A seventh mating surface 114 is oriented at an angle with respect to the longitudinal axis 60 and is contiguous with the fifth mating surface 110. Seventh mating surface 114 contacts seventh sub-surface 94 initially upon assembly. An eighth mating surface 116 is between the sixth and seventh mating surfaces 112 and 114, is in facing relation with the eighth sub-surface 96 and in spaced apart relation therefrom thereby forming a gap 117. The gap 117 is ensured by the eighth mating surface 116 comprising a recess in the arcuate projection (key) 50.

In a practical design, the mating surfaces will have orientation angles matched to the respective sub-surfaces they contact. Thus the first mating surface 102 may have an orientation angle 119 from about 80° to about 90° with respect to the longitudinal axis 60, with an orientation angle of about 89° being advantageous. The second mating surface 104 may have an orientation angle 118 from about 40° to about 70° with respect to the longitudinal axis 60. An orientation angle 118 of about 50° is considered advantageous for certain applications. The third mating surface 106 may have an orientation angle 120 from about 1° to about 25° with respect to the longitudinal axis 60. An orientation angle 120 of about 10° is considered advantageous for certain applications. The orientation angle 121 of the fourth mating surface 108 may range from about +5° to about −5° with respect to the longitudinal axis 60.

Similarly, the fifth mating surface 110 may have an orientation angle 123 from about 80° to about 90° with respect to the longitudinal axis 60, with an orientation angle of about 89° being advantageous. The sixth mating surface 112 may have an orientation angle 122 from about 40° to about 70° with respect to the longitudinal axis 60. An orientation angle 122 of about 50° is considered advantageous for certain applications. The seventh mating surface 114 may have an orientation angle 124 from about 1° to about 25° with respect to the longitudinal axis 60. An orientation angle 124 of about 10° is considered advantageous for certain applications. The orientation angle 125 of the eighth mating surface 116 may range from about +5° to about −5° with respect to the longitudinal axis 60.

Figure 3A:
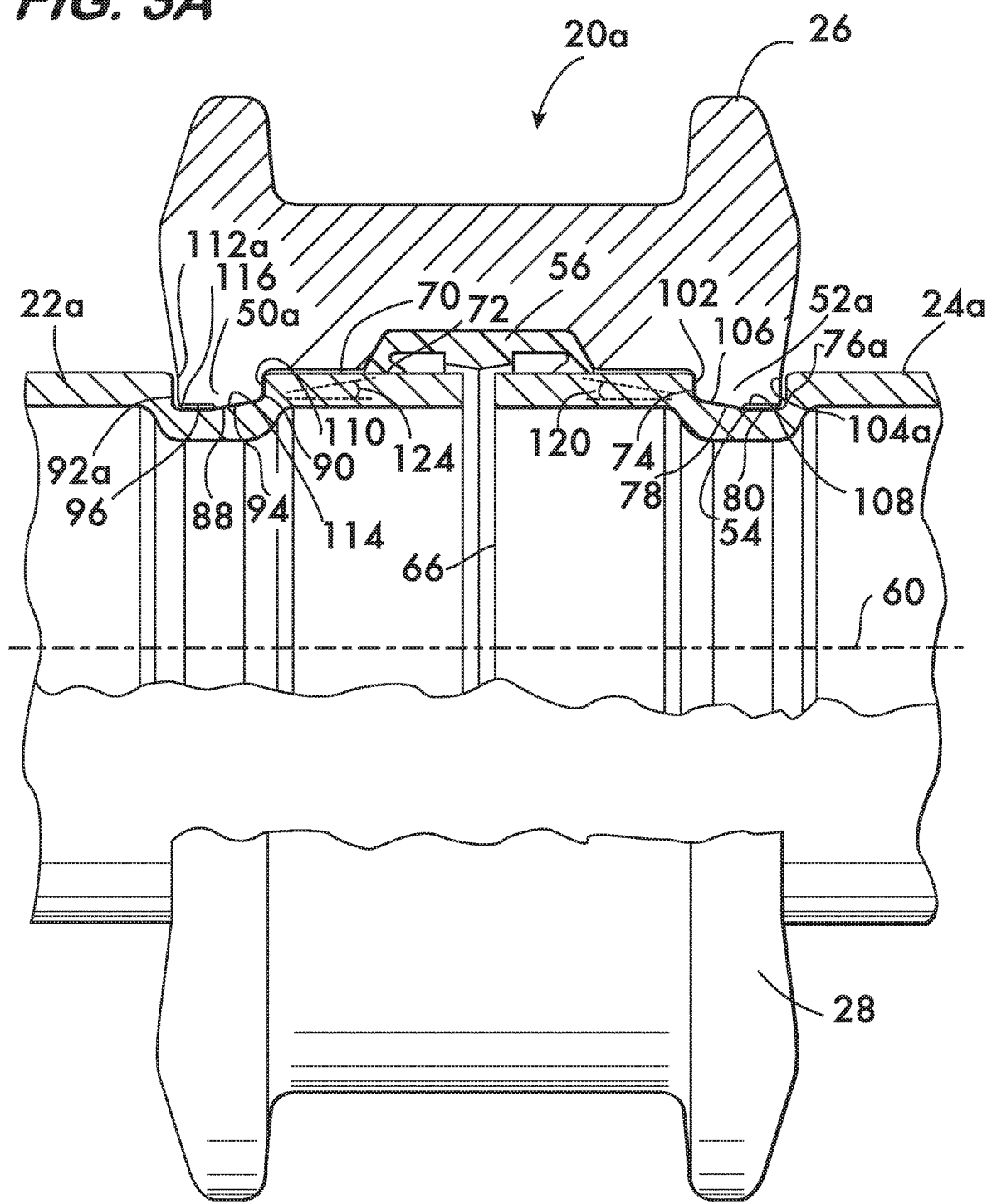
FIG. 3A is a longitudinal sectional view of a portion of another example coupling and pipe elements according to the invention.

FIG. 3A illustrates another example embodiment wherein coupling 20a joins pipe elements 22a and 24a. In this example embodiment the sub-surface 92a on pipe element 22a and its mating surface 112a on key 50a of coupling 20a are oriented at about 90° to the longitudinal axis 60. Similarly, sub-surface 76a on pipe element 24a and its mating surface 104a on key 52a of coupling 20a are oriented at about 90° to the longitudinal axis 60. As evidenced by the absence of gaps between mating surface 110 and sub-surface 90 and mating surface 102 and sub-surface 74, the joint is shown subjected to internal pressure induced end loads and/or axial tensile forces, as explained in detail below.

Figure 3B:
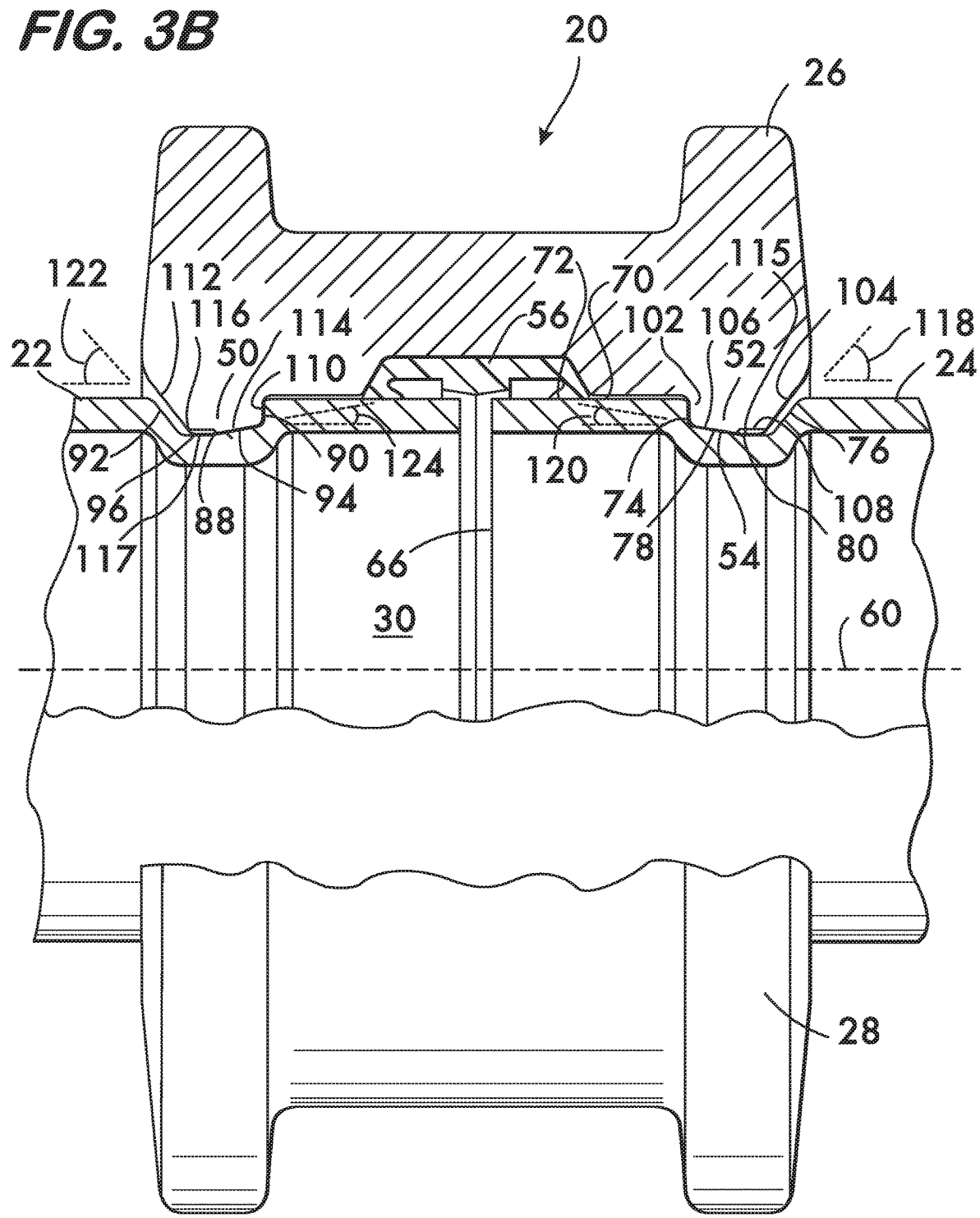
FIG. 3B is a longitudinal sectional view of the portion of the example coupling and pipe elements shown in FIG. 3 in the fully loaded condition.

Example pipe elements 22 and 24 (or 22a and 24a), when used in combination with the example coupling 20 (or coupling 20a, respectively) provide a marked improvement over prior art direct mechanical roll groove or machined groove coupling systems. The improved performance is due to a better axial load distribution, which, unlike prior art couplings, is not borne entirely at the first and fifth sub-surfaces 74 and 90. Rather, a portion of the axial load is borne by the sub-surfaces 74 and 90 as a result of contact between the third mating surface 106 and the third sub-surface 78 and the seventh mating surface 114 and the seventh sub-surface 94. These mating surfaces on the coupling and sub-surfaces on the pipe elements are oriented at an angle with respect to the longitudinal axis 60. Thus, when, as shown in FIG. 3B, the pipe joint is subjected to internal pressure induced end loads and/or axial tensile forces, the pipe elements 22 and 24 (or 22a and 24a) move axially away from one another, the aforementioned mating surfaces 106 and 114 ride up angled sub-surfaces 78 and 94 to come into greater wedging, clamping contact with the mating surfaces 106 and 114 respectively, until mating surfaces 102 and 110 firmly contact the first and fifth sub-surfaces 74 and 90 of the pipe element 24 and 22 (or 24a and 22a). The internal pressure induced end loads and/or axial tensile forces are thus resisted not only by contact between mating surfaces 102 and 110 of the coupling and sub-surfaces 74 and 90 of the pipe elements, but also by the wedging, clamping contact of mating surfaces 106 and 114 with angled sub-surfaces 78 and 94. Keys 50 and 52 (also 50a and 52a) are designed so that they do not completely fill their respective grooves 88 and 54. Rather, as the pipe joint is loaded, pipe elements 22 and 24 push away from one another until sub-surfaces 74 and 90 come into contact with mating surfaces 102 and 110 respectively. This will open a gap between sub-surfaces 92 and 76 and their respective mating surfaces 112 and 114. The spaced relation of the fourth mating surface 108 from the fourth sub-surface 80 and the spaced relation of the eighth mating surface 116 from the eighth sub-surface 96 provide the needed space to ensure that contact is achieved between sub-surface 78 and mating surface 106 as well as between sub-surface 94 and mating surface 114.

The load sharing which provides improved performance is effected by the geometries of the keys 50 and 52 and the respective grooves 88 ad 54 which they engage as well as the method of assembly and using the coupling and pipe elements according to the invention. In an example embodiment of one method of assembly, described for pipe element 24 and coupling 20 with reference to FIG. 3, comprises contacting the third sub-surface 78 of groove 54 with a portion (third mating surface 106) of the arcuate projection (key) 52, and contacting the second sub-surface 76 of groove 54 with another portion (second mating surface 104) of the arcuate projection (key) 52. When the combination includes the second pipe element 22 the assembly proceeds similarly; contacting the seventh sub-surface 94 of groove 88 with a portion (seventh mating surface 114) of the arcuate projection (key) 50, and contacting the sixth sub-surface 92 of groove 88 with another portion (sixth mating surface 112) of the arcuate projection (key) 52.

An example method of using the coupling 20 having arcuate projections 50, 52 engaged with grooves 88, 54 of the pipe elements 22 and 24 is illustrated with reference to FIGS. 3 and 3B and comprises assembling coupling segments 26 and 28 about pipe elements 22 and 24, such that keys 50 and 52 are located within grooves 88 and 54, respectively (FIG. 3). Fasteners 44 are then installed and tightened to connect attachment members 32 and 34 and ensure that at least mating surfaces 106 and 114 come into contact with sub-surfaces 78 and 94 respectively. As shown in FIG. 3B, forces are applied to the coupling (arising from system pressure, gravitational or other end loads) which create a tensile force between the pipe elements and the coupling, thereby causing respective portions of the arcuate projections (first and fifth mating surfaces 102, 110) to engage respective first and fifth sub-surfaces 74 and 90 of grooves 54 and 88, and other portions (third and seventh mating surfaces 106 and 114) of the arcuate projections 52 and 50 to respectively engage the third and seventh sub-surfaces 78 and 94.

Pipe elements and their associated couplings according to the invention have demonstrated a marked improvement in the goal of realizing a greater portion of the potential strength of the pipe element when compared to prior art pipe elements and couplings.

What is claimed is:
1. In combination, a pipe element having first and second oppositely disposed ends and a coupling, said pipe element comprising:
  a sidewall surrounding a longitudinal axis and defining a bore, said sidewall having an outer surface;
  a first groove positioned in said outer surface, said first groove extending circumferentially around said bore and positioned proximate to said first end, said first groove being defined by a first plurality of sub-surfaces of said outer surface including:
  a first sub-surface oriented at an angle with respect to said longitudinal axis and facing away from said first end;
  a second sub-surface oriented at an angle with respect to said longitudinal axis, said second sub-surface being in spaced relation away from and facing toward said first sub-surface;
  a third sub-surface contiguous with said first sub-surface, said third sub-surface oriented at an angle with respect to said longitudinal axis and sloping toward said second sub-surface; and
  a fourth sub-surface contiguous with said third and second sub surfaces, said fourth sub-surface being oriented at an angle with respect to said longitudinal axis;
said coupling comprising:
  a plurality of segments attached to one another end to end surrounding said first end of said pipe element;

adjustable attachment members positioned at each end of said segments for attaching said segments to one another;

at least one arcuate projection positioned on one side of each of said segments and engaged with said first groove, said at least one arcuate projection comprising a plurality of mating surfaces including:

a first mating surface oriented at an angle with respect to said longitudinal axis and in facing relation with said first sub-surface;

a second mating surface oriented at an angle with respect to said longitudinal axis and in facing relation with said second sub-surface;

a third mating surface oriented at an angle with respect to said longitudinal axis and contacting said third sub-surface; and a fourth mating surface in facing relation with said fourth sub-surface; wherein said at least one arcuate projection comprises a recess therein forming a gap between fourth mating surface and said fourth sub-surface.

2. The combination according to claim 1, wherein said coupling comprises no more than two said segments.

3. In combination, a pipe element having first and second oppositely disposed ends and a coupling, said pipe element comprising:

a sidewall surrounding a longitudinal axis and defining a bore, said sidewall having an outer surface;

a first groove positioned in said outer surface, said first groove extending circumferentially around said bore and positioned proximate to said first end, said first groove being defined by a first plurality of sub-surfaces of said outer surface including:

a first sub-surface oriented at an angle with respect to said longitudinal axis and facing away from said first end;

a second sub-surface oriented at an angle with respect to said longitudinal axis, said second sub-surface being in spaced relation away from and facing toward said first sub-surface;

a third sub-surface contiguous with said first sub-surface, said third sub-surface oriented at an angle with respect to said longitudinal axis and sloping toward said second sub-surface; and a fourth sub-surface contiguous with said third and second sub surfaces, said fourth sub-surface being oriented at an angle with respect to said longitudinal axis;

said coupling comprising:

a plurality of segments attached to one another end to end surrounding said first end of said pipe element;

adjustable attachment members positioned at each end of said segments for attaching said segments to one another;

at least one arcuate projection positioned on one side of each of said segments and engaged with said first groove, said at least one arcuate projection comprising a plurality of mating surfaces including:

a first mating surface oriented perpendicular to said longitudinal axis and in facing relation with said first sub-surface;

a second mating surface oriented perpendicular to said longitudinal axis and in facing relation with said second sub-surface;

a third mating surface oriented at an angle with respect to said longitudinal axis and contacting said third sub-surface; and a fourth mating surface in facing relation with said fourth sub-surface; wherein said at least one arcuate projection comprises a recess therein forming a gap between said fourth mating surface and said fourth sub-surface.

4. The combination according to claim 3, wherein said coupling comprises no more than two said segments.

5. In combination, a pair of pipe elements and a coupling for joining said pipe elements, said coupling comprising:

a plurality of segments attached to one another end to end surrounding a central space for receiving said pipe elements;

adjustable attachment members positioned at each end of said segments for attaching said segments to one another;

at least a first arcuate projection positioned on a first side of each of said segments, said first arcuate projections comprising a plurality of mating surfaces including:

a first mating surface oriented at an angle with respect to a longitudinal axis extending through said central space coaxially with said segments;

a second mating surface in spaced relation from said first mating surface and oriented at an angle with respect to said longitudinal axis;

a third mating surface contiguous with said first mating surface and oriented at an angle with respect to said longitudinal axis; and a fourth mating surface between said third and second mating surfaces and oriented at an angle with respect to said longitudinal axis;

each of said pipe elements comprising:

a sidewall surrounding said longitudinal axis and defining a bore, said sidewall having an outer surface;

a first groove positioned in said outer surface, said first groove extending circumferentially around said bore and positioned proximate to said first end, said first groove being defined by a first plurality of sub-surfaces of said outer surface including:

a first sub-surface oriented at an angle with respect to said longitudinal axis and in facing relation with said first mating surface;

a second sub-surface oriented at an angle with respect to said longitudinal axis and in facing relation with said second mating surface;

a third sub-surface oriented at an angle with respect to said longitudinal axis and contacting said third mating surface; and a fourth sub-surface in facing relation with said fourth mating surface; wherein said first arcuate projection comprises a recess therein forming a gap between said fourth mating surface and said fourth sub-surface.

6. The coupling according to claim 5, said coupling further comprising:

a second arcuate projection positioned on a second side of each of said segments, said second arcuate projections comprising a plurality of mating surfaces including:

a fifth mating surface oriented at an angle with respect to said longitudinal axis;

a sixth mating surface in spaced relation from said fifth mating surface and oriented at an angle with respect to said longitudinal axis;

a seventh mating surface contiguous with said fifth mating surface and oriented at an angle with respect to said longitudinal axis; and an eighth mating surface between said sixth and seventh mating surfaces and oriented at an angle with respect to said longitudinal axis.

7. The coupling according to claim 6, wherein said first and fifth mating surfaces have an orientation angle from 80° to 90° with respect to said longitudinal axis.

8. The coupling according to claim 6, wherein said first and fifth mating surfaces have an orientation angle of 89° with respect to said longitudinal axis.

9. The coupling according to claim 6, wherein said third and seventh mating surfaces have an orientation angle from 1° to 25° relative to said longitudinal axis.

10. The coupling according to claim 6, wherein said third and seventh mating surfaces have an orientation angle of 10° relative to said longitudinal axis.

11. The coupling according to claim 6, wherein said second and sixth mating surfaces have an orientation angle of 90° with respect to said longitudinal axis.

12. The coupling according to claim 6, wherein said second and sixth mating surfaces have an orientation angle from 40° to 70° relative to said longitudinal axis.

13. The coupling according to claim 6, wherein said second and sixth mating surfaces have an orientation angle of 50° relative to said longitudinal axis.

14. The coupling according to claim 6, wherein said fourth and eighth mating surfaces have an orientation angle from +5° to −5° with respect to said longitudinal axis.

15. The coupling according to claim 6, wherein said coupling comprises no more than two said segments.

16. The coupling according to claim 5, wherein said first mating surface has an orientation angle from 80° to 90° with respect to said longitudinal axis.

17. The coupling according to claim 5, wherein said first mating surface has an orientation angle of 89° with respect to said longitudinal axis.

18. The coupling according to claim 5, wherein said third mating surface has an orientation angle from 1° to 25° relative to said longitudinal axis.

19. The coupling according to claim 5, wherein said third mating surface has an orientation angle of 10° relative to said longitudinal axis.

20. The coupling according to claim 5, wherein said second mating surface has an orientation angle of 90° with respect to said longitudinal axis.

21. The coupling according to claim 5, wherein said second mating surface has an orientation angle from 40° to 70° relative to said longitudinal axis.

22. The coupling according to claim 5, wherein said second mating surface has an orientation angle of 50° relative to said longitudinal axis.

23. The coupling according to claim 5, wherein said fourth mating surface has an orientation angle from +5° to −5° with respect to said longitudinal axis.

24. The coupling according to claim 5, wherein said coupling comprises no more than two said segments.

25. In combination, a coupling and a pipe element having first and second ends oppositely disposed, said coupling comprising:
    a plurality of segments attached to one another end to end surrounding said first end of said pipe element;
    adjustable attachment members positioned at each end of said segments for attaching said segments to one another;
    at least a first arcuate projection positioned on a first side of each of said segments, said first arcuate projections comprising a plurality of mating surfaces including:
    a first mating surface oriented at an angle with respect to a longitudinal axis extending through said central space coaxially with said segments;
    a second mating surface in spaced relation from said first mating surface and oriented at an angle with respect to said longitudinal axis;
    a third mating surface contiguous with said first mating surface and oriented at an angle with respect to said longitudinal axis;
    a fourth mating surface between said third and second mating surfaces and oriented at an angle with respect to said longitudinal axis;
said pipe element comprising:
    a sidewall surrounding said longitudinal axis and defining a bore, said sidewall having an outer surface;
    a first groove positioned in said outer surface, said first groove extending circumferentially around said bore and positioned proximate to said first end, said first groove being defined by a first plurality of sub-surfaces of said outer surface including:
    a first sub-surface oriented perpendicular to said longitudinal axis and in facing relation with said first mating surface;
    a second sub-surface oriented perpendicular to said longitudinal axis and in facing relation with said second mating surface;
    a third sub-surface oriented at an angle with respect to said longitudinal axis and contacting said third mating surface; and
    a fourth sub-surface in facing relation with said fourth mating surface; wherein said first arcuate projection comprises a recess therein forming a gap between said fourth mating surface and said fourth sub-surface.

* * * * *